June 28, 1949.

J. ROSSMAN 2,474,790

GASKET CENTERING MEANS

Filed March 28, 1946

Inventor
Joseph Rossman

Patented June 28, 1949

2,474,790

UNITED STATES PATENT OFFICE 2,474,790

GASKET CENTERING MEANS

Joseph Rossman, Washington, D. C., assignor to United States Gasket Company, Camden, N. J., a corporation of New Jersey Application March 28, 1946, Serial No. 657,683

1 Claim. (Cl. 288—27)

This invention relates to a gasket centering construction. More specifically, the invention relates to a means for centering gaskets between the flange portions of pipe sections to be joined together and other similar surfaces that are to be sealed.

An object of the invention is to provide a gasket centering means that can be manufactured from the same components or elements used in manufacturing the gasket. The invention relates particularly to a centering ring made of spirally wound metal ribbon or tape having interposed between certain convolutions an asbestos packing strip or other like non-metallic compressible packing material. Such centering ring is adapted to be positioned in embracing relation to a gasket also constructed of convolutely wound metal ribbon having an asbestos or other non-metallic packing strip interposed between certain of the convolutions thereof.

Figure 1:
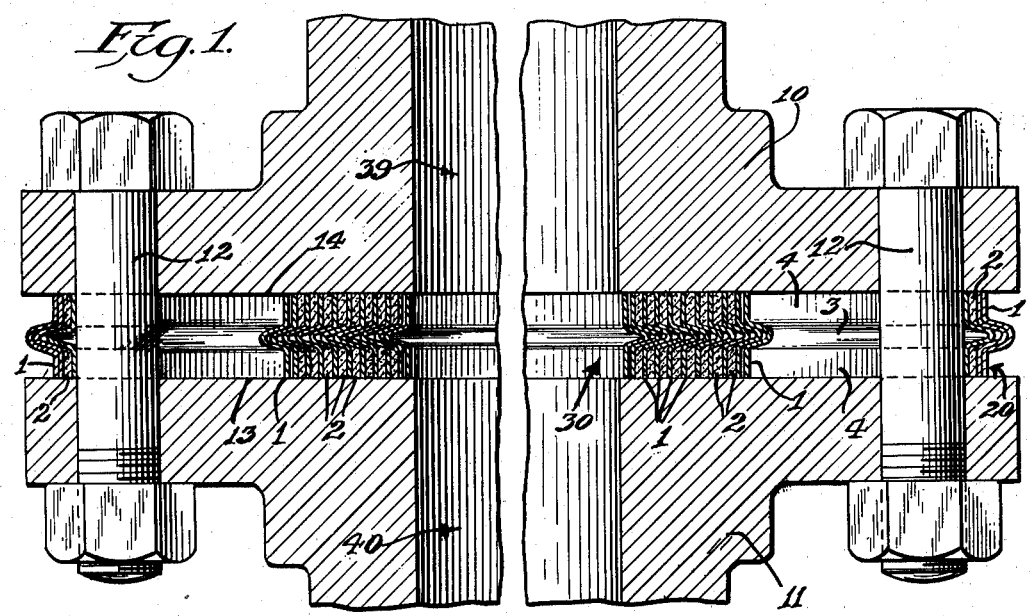
Figure 2:
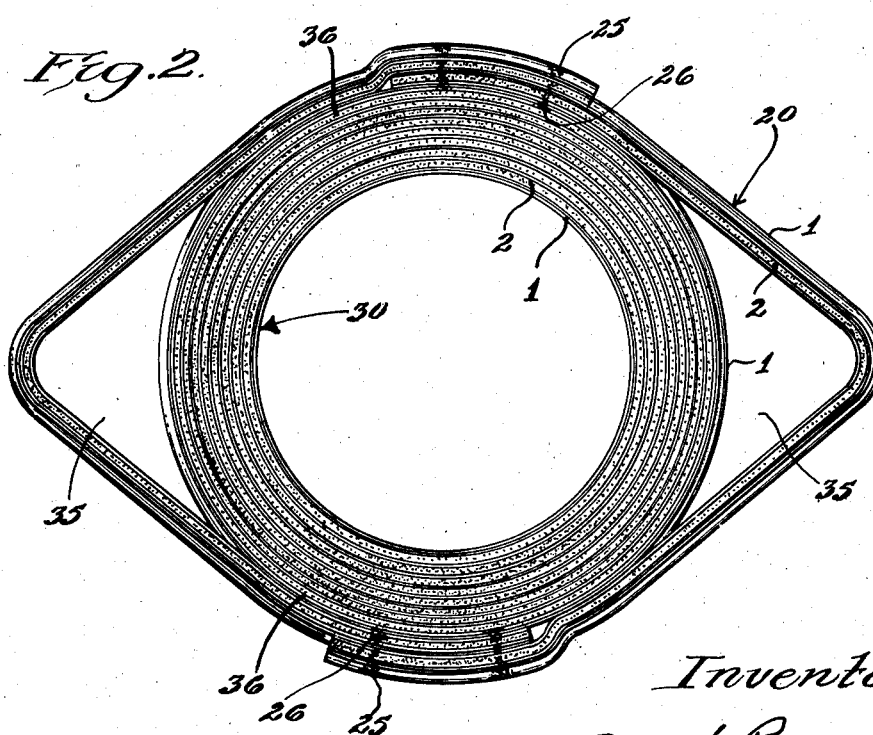

Further objects and advantages of the invention will be apparent from the following specification and drawing, wherein Figure 1 is a vertical sectional view of a gasket and centering ring assembly made in accordance with the present invention positioned in sealing relation between two bolted pipe flanges, and Figure 2 is a plan view of the centering ring and gasket assembly.

Referring to the drawings, the gasket, indicated by numeral 30, consists of a spirally wound relatively thin guage flexible metal tape or ribbon 1, preferably made of steel, provided with a medial bead portion 3 and lateral flange portions 4 integral therewith at either side thereof and relatively thin compressible or resilient packing strips 2 of asbestos, fiberglass or other suitable non-metallic packing material not greater in width than that of the flange portions 4 interposed and wound between the flange portions. No packing strip is preferable interposed between the two outermost and two innermost metal convolutions and the ends of the metal ribbon are spot welded to the convolution therebeneath to prevent unravelling.

The centering ring, designated by numeral 20, is formed of the same kind of metal ribbon 1 of which the gasket is made, as previously described, having a beaded medial portion and lateral flange portions convolutely wound and having relatively thin strips of asbestos or other non-metallic packing 2 interposed between the flange portions between at least two complete convolutions of the metal ribbon 1. The two outermost and innermost metal convolutions preferably have no packing strip therebetween and the ends of the metal ribbon are spot welded at 25 to the convolution therebeneath to prevent unravelling.

The centering ring is formed on a mandrel so as to have a substantially oval-shaped contour as shown in Figure 2 having spaced ear portions 35 and of dimensions suitable for embracing opposed peripheral arc portions 36 of gasket 30. If desired the centering ring may be spot welded at 26 to the outer periphery of the gasket so as to form an integral assembly.

In use the centering ring assembly is adapted to be positioned between pipe flanges 13 and 14, the bolts 12 passing through the ear portions 35 and contacting same, whereby the gasket 30 will be accurately positioned between the opposed flange surfaces of flanges 10 and 11 of pipe sections 39 and 40.

The width of the metal ribbon 1 used for making the centering ring 20 is preferably of the same width and beaded contour as the metal ribbon used for making the gasket 30 so that the centering ring will be adapted to snugly embrace and retain the peripheral contacting portions of the gasket. By utilizing the same width and contour of the metal ribbon the same equipment used for manufacturing the gasket can be readily adapted for making the centering ring. The use of an asbestos packing tape or other relatively resilient and compressible non-metallic packing strip between at least two metal convolutions of the centering ring imparts lateral compressibility to the ring so that it can be readily compressed or deformed when clamped between flange portions 10 and 11 of the pipe sections so as not to interfere with the application of greater pressure to the gasket 30 in order to provide an adequate seal between the gasket edges and the flange faces 13 and 14.

The centering ring 20 is thus laterally compressible to a much greater degree than the gasket 30 which is considerably more rigid and resistant to lateral pressure because it consists of at least twice as many or more metal convolutions than those present in the centering ring. The gasket 30 will thus resist distortion under a greater compressive stress as compared with centering ring 20. At the same time the centering ring is sufficiently rigid for handling prior to use so as not to buckle, distort or break.

It is to be understood that numerous modifications and changes can be made of the specific details herein disclosed and it is intended to include such modifications within the scope of the appended claim.

I claim:

A gasket assembly comprising a gasket formed of convolutely wound metal tape and a non-metallic packing strip interposed between the metal convolutions, and a substantially oval-shaped centering ring having diametrically opposed ear portions and diametrically opposed arc-shaped portions, said arc-shaped portions embracing said gasket, said centering ring being formed of convolutely wound metal tape of a lesser number of convolutions than in said gasket and having a non-metallic packing strip interposed between said convolutions, said centering ring being laterally compressible to a greater degree than said gasket when the assembly is subjected to the same lateral compressive force.

JOSEPH ROSSMAN.

REFERENCES CITED

The following references are of record in the file of this patent:

UNITED STATES PATENTS

| Number | Name | Date |
|---|---|---|
| 841,059 | Shutt | Jan. 8, 1907 |
| 1,171,295 | Young | Feb. 8, 1916 |
| 2,027,299 | Bohmer | Jan. 7, 1936 |
| 2,244,640 | Davis | June 3, 1941 |